(12) United States Patent
Tada

(10) Patent No.: US 6,676,550 B2
(45) Date of Patent: Jan. 13, 2004

(54) BLADE TENSIONER

(75) Inventor: Naosumi Tada, Nabari (JP)

(73) Assignee: Borg-Warner Automotive K.K. (JP)

( * ) Notice: Subject to any disclaimer, the term of this patent is extended or adjusted under 35 U.S.C. 154(b) by 0 days.

(21) Appl. No.: 09/878,846

(22) Filed: Jun. 11, 2001

(65) Prior Publication Data

US 2002/0072442 A1 Jun. 13, 2002

(30) Foreign Application Priority Data

Jun. 9, 2000 (JP) ........................................ 2000-172830

(51) Int. Cl.[7] ................................................. F16H 7/08
(52) U.S. Cl. ....................................... 474/111; 474/101
(58) Field of Search ................................ 474/101, 111; 267/164, 165, 36.1, 47

(56) References Cited

U.S. PATENT DOCUMENTS

| | | | | |
|---|---|---|---|---|
| 1,036,247 A | * | 8/1912 | Huston | 267/45 |
| 1,127,511 A | * | 2/1915 | Potter | 267/36.1 |
| 1,265,623 A | * | 5/1918 | Currey | 267/260 |
| 1,678,035 A | * | 7/1928 | Davis | 267/47 |
| 1,743,049 A | * | 1/1930 | Smith | 267/47 |
| 1,745,269 A | * | 1/1930 | Pilz | 267/47 |
| 4,832,664 A | * | 5/1989 | Groger et al. | 123/90.15 |
| 5,462,493 A | * | 10/1995 | Simpson | 474/111 |
| 5,984,815 A | * | 11/1999 | Baddaria | 474/111 |

* cited by examiner

*Primary Examiner*—David Fenstermacher
(74) *Attorney, Agent, or Firm*—Fitch, Even, Tabin & Flannery; Greg Dziegielewski

(57) ABSTRACT

A blade tensioner is configured with a blade shoe having a chain sliding face, several plate-spring-like blade springs stacked on the reverse side of chain sliding face of the blade shoe in order to apply a spring force to the blade shoe, and spacer members provided between respective adjoining blade springs and brought in contact with corresponding blade springs at least at two points separated from each other by a fixed distance. In such case, the blade springs contact the spacer members at a fixed span. Accordingly, the damping factor of the overall blade spring or system is constant, so that the damping performance of the blade tensioner can be stabilized.

20 Claims, 6 Drawing Sheets

BLADE TENSIONER

FIELD OF THE INVENTION

The present invention pertains to a blade tensioner equipped with a blade shoe having a chain sliding face and several plate-like blade springs for applying a spring force to the blade shoe.

BACKGROUND OF THE INVENTION

Conventionally, a blade tensioner has been utilized as a tensioner for applying tension to a chain. An example of a prior art blade tensioner is shown in FIG. 9.

As shown in FIG. 9, a prior art blade tensioner 100 may be configured primarily with a resin blade shoe 101 having a curved chain sliding face 101a and several metal blade springs 102 stacked on the reverse side of the chain sliding face 101a of the blade shoe 101 in order to apply a spring force to the blade shoe 101. Respective ends of the plate-spring-like blade springs 102 may be disposed in concave parts 111 and 113 created at a tip part 110 and a base part 112 of the blade shoe 101.

In addition, a bracket 120 for installing the blade tensioner 100 into an engine can be provided. Holes 121 and 122 for inserting attachment bolts may be created on the bracket 120. A sliding face 125 which allows the tip part 110 of the blade shoe 101 to slide while remaining in contact is created at the tip of the bracket 120, and a pin 130 which supports the base part 112 of the blade shoe 101 while allowing it to pivot freely can be fixed near the center of the bracket 120 by one end.

During the operation of the chain, the chain runs while sliding on the chain sliding face 101a of the blade shoe 101. At this time, a pressing load created as the blade shoe 101 and the blade springs 102 are deformed may act upon the chain, so that constant tension of the chain is maintained. In addition, chord vibrations caused by thrashing of the chain and/or fluctuation of tension are propagated to the respective blade springs 102 in the blade shoe 101 via the blade shoe 101. At this time, the adjoining blade springs 102 slide against each other as the respective blade springs 102 are repeatedly subjected to elastic deformation and return deformation, and the chord vibrations of the chain are damped.

The blade springs as products are subject to quite significant variation in terms of curvature and length. Thus, when several of the blade springs are stacked and installed into the blade shoe, as shown in FIG. 10, contact positions C and C', contact conditions, and gaps between the respective blade springs 102 may vary.

As a result, the overall damping factor of the blade springs varies, creating a problem that the damping performance of a blade tensioner may vary.

SUMMARY OF THE INVENTION

In accordance with an aspect of the invention, a blade tensioner is provided for applying tension to a chain equipped with a blade shoe having a chain sliding face, several plate-spring-like blade springs stacked on the reverse side of the aforementioned chain sliding face of the aforementioned blade shoe in order to apply a spring force to the aforementioned blade shoe, and spacer members provided between the aforementioned adjoining blade springs and brought in contact with corresponding blade springs at at least two points separated from each other by a fixed distance.

During the operation of the chain, the chain runs while sliding on the chain sliding face of the blade shoe. At this time, a pressing load created as the blade shoe and the blade springs are deformed may act upon the chain, so that constant tension is imparted upon the chain.

What is more, in such case, spacer members may be provided between the respective adjoining blade springs, and the spacer members can be brought in contact with the corresponding blade springs at at least two points separated from each other by a fixed distance.

That is, the respective blade springs can be in contact with the spacer members at junctions of a fixed span instead of at irregular contact points. Accordingly, fluctuation of the damping factor of the overall blade spring or system can be reduced or eliminated, so that the damping performance of the blade tensioner can be stabilized.

In an aspect of the blade tensioner of the invention, almost uniform gaps can be created between the aforementioned adjoining blade springs. In such case, when the pressing load is applied by the chain, uneven contact between the deformed blade springs can be avoided. Accordingly, fluctuation of the damping factor of the overall blade spring due to changes in the contact condition can be prevented.

In a further aspect of the blade tensioner of the invention, the aforementioned spacer member may be configured with several spacer parts laid out at certain intervals in the width direction of the spring and a pair of connector parts extending in the length direction of the spring while connecting the aforementioned respective spacer parts.

In such case, because each spacer part functions to serve as a spacer between blade springs, an almost uniform gap can be created between the blade springs along the length direction of the springs due to these spacer parts. Accordingly, the curvature of the respective blade springs can be made almost uniform. As a result, the damping factor of the overall blade spring can be constant, so that the damping performance of the blade tensioner can be stabilized.

What is more, in such case, because almost uniform gaps can be created between the respective adjoining blade springs, the deformed blade springs can uniformly contact the spacer members to be brought into contact with them as the pressing load is applied by the chain. Accordingly, the damping performance of the overall blade spring can be stabilized. In addition, in such case, because the number of contact faces with the spacer members increases, the damping force of the blade tensioner can be improved.

In yet another aspect of the invention, the aforementioned spacer part may have a cross section in the shape of a circle, an oval, or a rectangle.

According to another aspect of the invention, retainer parts for preventing the aforementioned spacer members from falling off the aforementioned blade springs may be created at the ends of the aforementioned spacer parts.

According to yet another aspect of the invention, the aforementioned connector parts may have a retaining function to prevent the aforementioned spacer members from falling off the aforementioned blade springs.

In another aspect of the invention, the aforementioned spacer members may be created by means of molding or press-punching a net band.

In yet another aspect of the invention, contact faces between the aforementioned spacer members and the aforementioned blade springs may be provided with a friction material. In such case, the damping force can be increased by the spacer members; and the damping performance of the blade tensioner can be improved accordingly.

DETAILED DESCRIPTION

Figure 1:
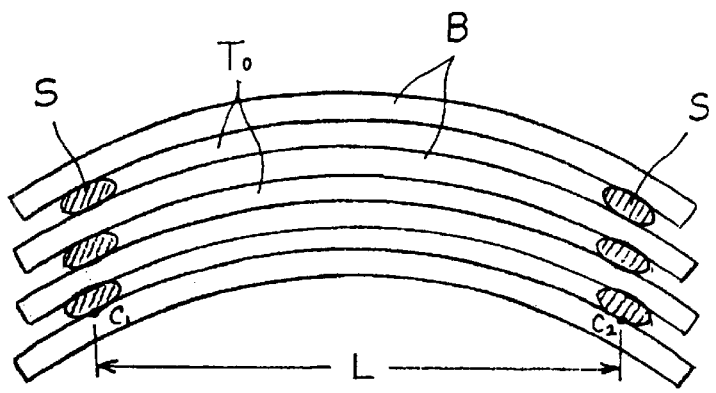
FIG. 1 is a side view of a blade spring assembly applied to a blade tensioner in accordance with an aspect of the present invention.

FIG. 1 is a side view of blade springs applied to the blade tensioner in accordance with an aspect of the present invention. As shown in FIG. 1, spacer members S are inserted between respective adjoining blade springs B and B at fixed span L.

Respective blade springs B come in contact with spacer members S at junctions $C_1$ and $C_2$ separated from each other by a fixed distance without contact occurring at irregular contact positions. As a result, fluctuation of the damping factor of the overall blade spring can be eliminated, so that the damping performance of the blade tensioner can be stabilized.

In addition, in such case, almost uniform gaps $T_0$ can be created with respect to the spaces created between the respective adjoining blade springs B and B. As a result, when a pressing load is applied by the chain, uneven contact between the deformed blade springs can be avoided. Accordingly, fluctuation of the damping factor of the overall blade spring due to changes in the contact condition can be prevented.

Figure 9:
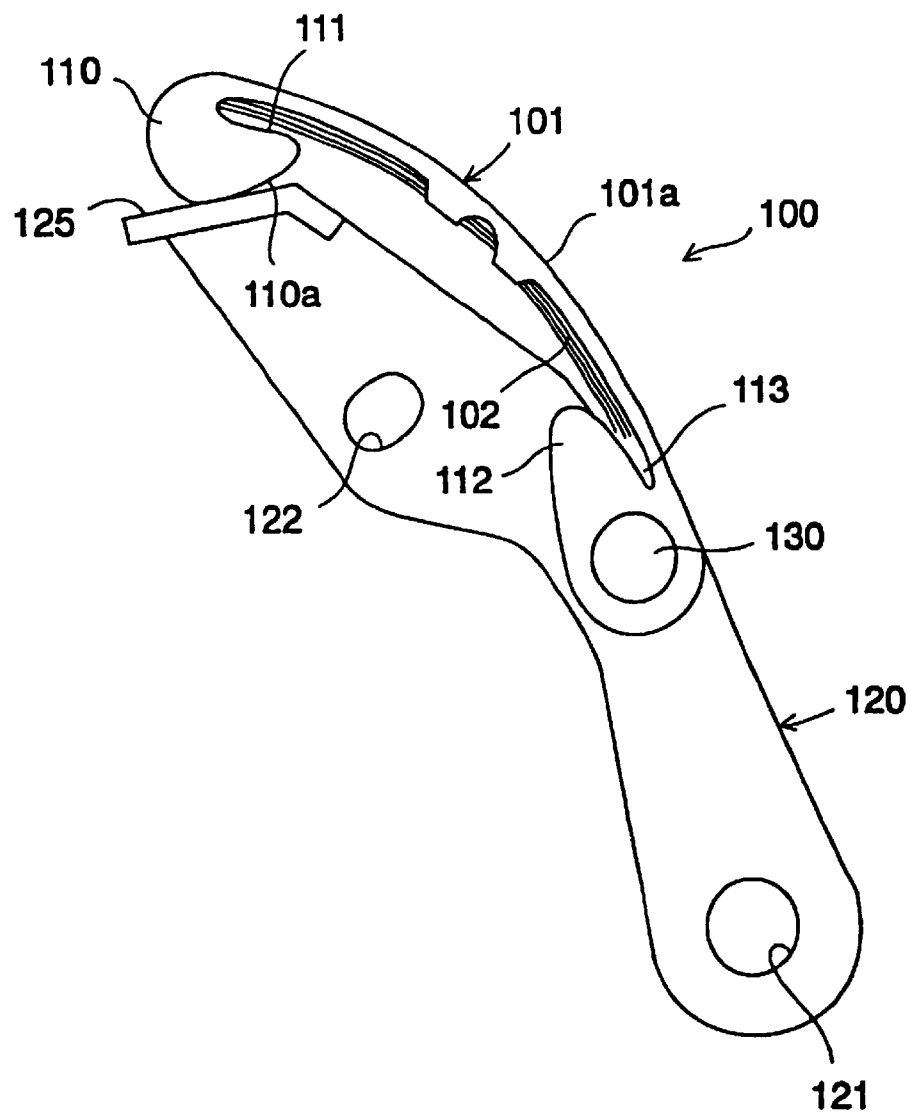
FIG. 9 is a side view of a prior art blade tensioner.
Figure 10:
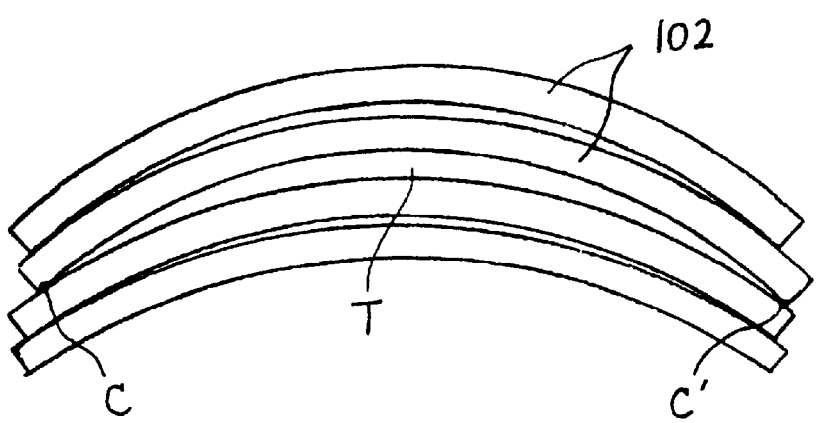
FIG. 10 is a diagram for explaining problems of a blade spring assembly in a prior art blade tensioner.

While the blade spring assembly containing such blade springs B and spacer members S in accordance with the present invention can be applied to the blade tensioner shown in FIG. 9, it is not limited to a blade tensioner with this structure; it can be applied also to any arbitrary blade tensioner as long as the blade tensioner has several blade springs stacked on the reverse side of the chain sliding face of the blade shoe.

Figure 2:
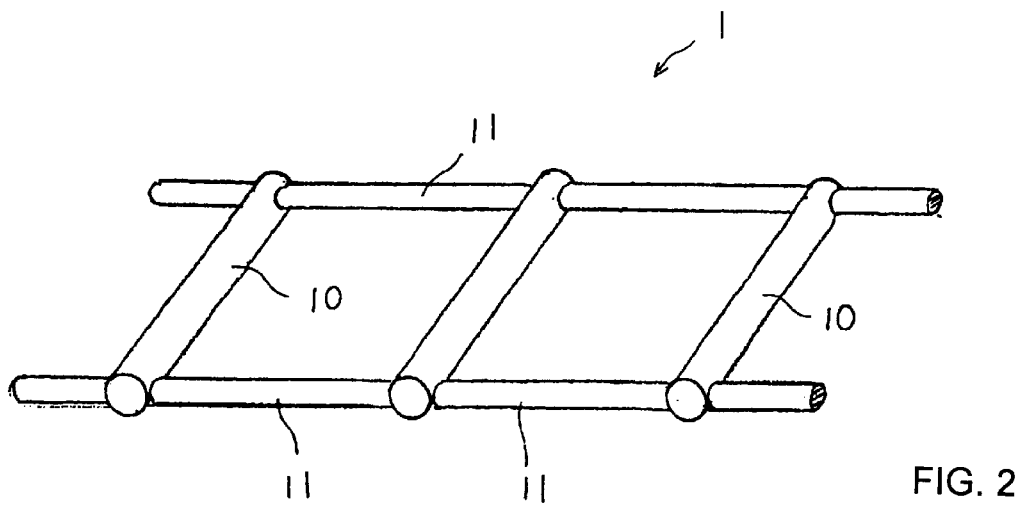
FIG. 2 is a partial oblique view of a spacer member in accordance with an aspect of the present invention.

FIG. 2 is a partial oblique view of a spacer member in an aspect of the present invention. As shown in FIG. 2, the spacer member 1 is configured with several spacer parts 10 extending in the width direction of the respective blade springs B (direction perpendicular to the page in FIG. 1) and laid out at certain intervals from each other and a pair of connector parts 11 extending in the length direction of the blade spring B while connecting the respective spacer parts 10.

In this case, because each respective spacer part 10 functions to serve as a spacer between the blade springs B and B, an almost uniform gap can be created along the length direction of the spring between the blade springs B and B due to these spacer parts 10. Accordingly, the curvature of the respective blade springs B can be made almost uniform. As a result, the damping factor of the overall blade spring is constant, and the damping performance of the blade tensioner can be stabilized.

What is more, in such case, because an almost uniform gap $T_0$ is created between adjoining blade springs B and B, the deformed blade springs can uniformly contact the spacer members to be brought into contact with them as the pressing load is applied by the chain. Accordingly, the damping performance of the overall blade spring can be stabilized. In addition, in such case, because the number of contact faces between the blade springs and the spacer members increases, the damping force of the blade tensioner can be improved.

In addition, respective blade springs B come in contact with spacer parts 10 at 3 or more junctions separated from each other by a fixed distance due to these spacer members S. In this case, too, respective blade springs B still contact the spacer members at a fixed span. As a result, fluctuation of damping factor of the overall blade spring is eliminated, so that the damping performance of the blade tensioner can be stabilized.

The spacer member 1 can be a molded product of synthetic resin or a molded product of a raw material of rubber. The cross section of the spacer part 10 does not necessarily have the round shape shown in FIG. 2, and the shape may be oval or rectangular.

The blade tensioner according to an aspect of the invention offers an effect that because the spacer members have cross sections in the shape of a circle, an oval, or a rectangle, the spacer members can be produced easily.

Figure 3:
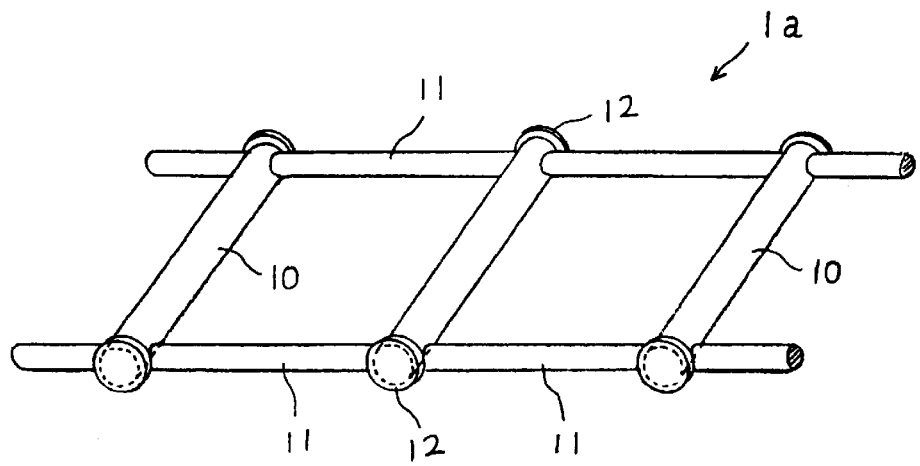
FIG. 3 is a partial oblique view of a spacer member provided with retainer parts, showing a modification example of the spacer member in FIG. 2.

FIG. 3 shows a case in which the spacer member shown in FIG. 2 also has a retaining function, wherein the same symbols in FIG. 3 indicate the same parts as in FIG. 2 or the equivalent. In the spacer member 1a, retainer parts 12 with a diameter larger than the outer diameter of the respective spacer parts 10 are created at both ends of the respective spacer parts 10. These retainer parts 12 help prevent the spacer members from falling off the blade springs.

Figure 4:
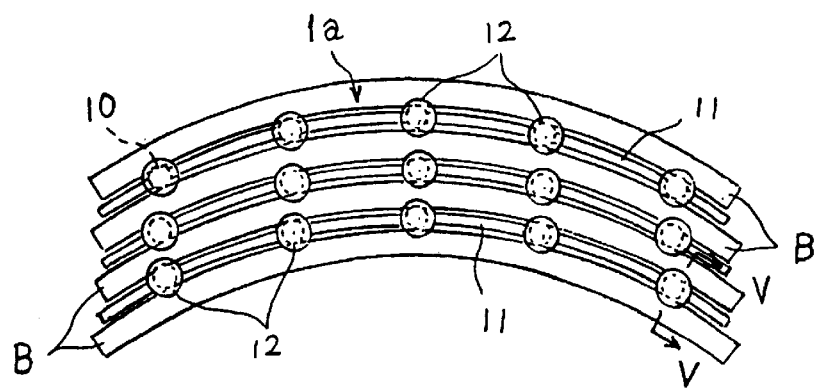
FIG. 4 is a side view of the blade spring assembly containing the spacer member of FIG. 3.
Figure 5:
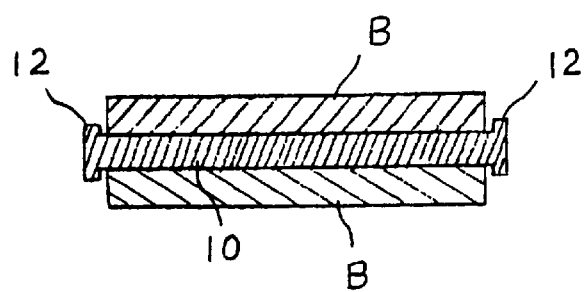
FIG. 5 is a cross section of FIG. 4 along line V-V.

A condition in which the spacer members 1a are installed between the blade springs B and B is shown in FIG. 4. As shown in FIG. 4, almost uniform gaps are created respectively in the length direction of the springs between the adjoining blade springs B and B by the respective spacer parts 10 of the spacer members 1a. In addition, as clearly shown in FIG. 5, the retainer parts 12 are provided at both ends of the blade springs B in order to prevent the spacer members 1a from falling off the blade springs B after the blade tensioner is assembled.

Figure 6:
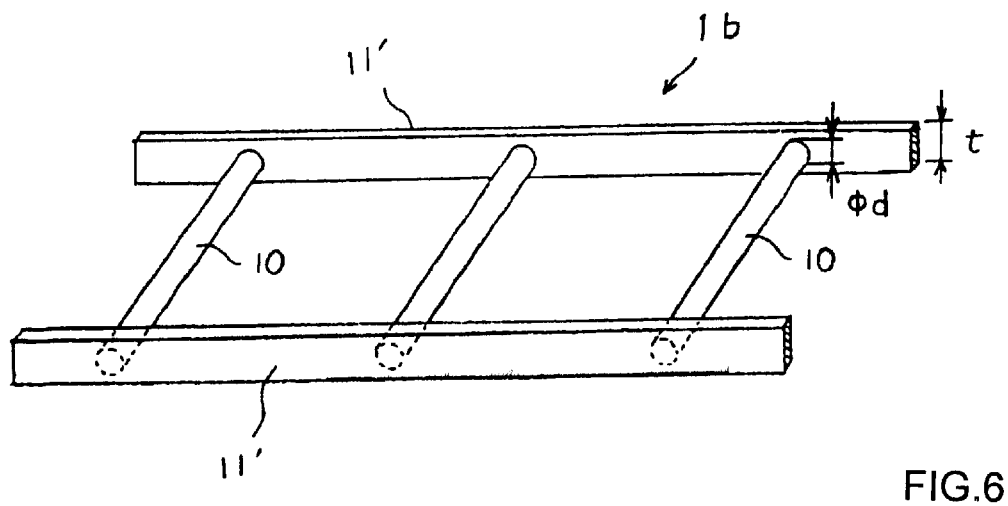
FIG. 6 is a partial oblique view of a spacer member provided with a retaining function, showing a modification example of the spacer member in FIG. 2.

Like FIG. 3, FIG. 6 shows a condition in which a retaining function has been added to the spacer member shown in FIG. 2, wherein the same symbols in FIG. 6 indicate the same parts or the equivalent in FIG. 2. In the case of the spacer member 1b, two connector parts 11' connecting the respective spacer parts 10 are provided with a retaining function.

In this case, when the outer diameter of the spacer part 10 with a round cross section is denoted as d and the width of thin-plate-like connector part 11' as t, the relationship expressed as d<t may be established. In this case, when the spacer member 1b is installed between the blade springs, the connector parts 11' are located on both sides of the blade spring B. Accordingly, the spacer members 1b can be prevented from falling off the blade springs B after the blade tensioner is assembled.

Figure 7:
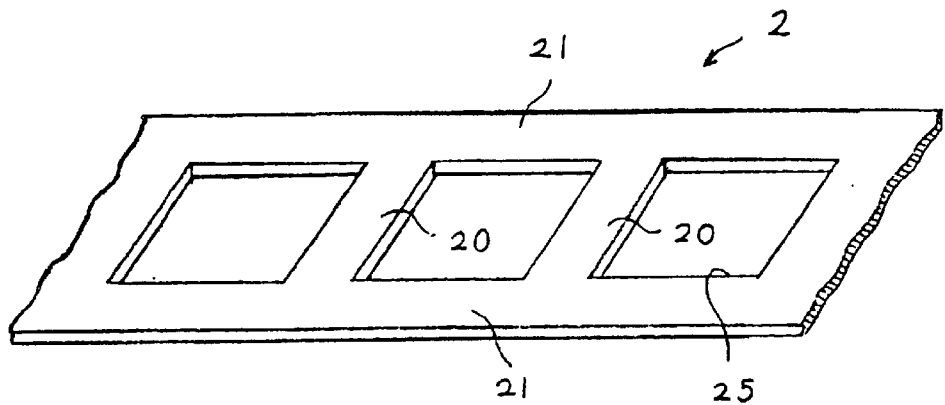
FIG. 7 is an oblique view of a spacer member in another aspect of the present invention.

FIG. 7 is a partial oblique view of a spacer member in another aspect of the present invention. As shown in FIG. 7, the spacer member 2 is created by press-punching rectangular holes 25 at fixed intervals on a steel band, whereby it is configured with several spacer parts 20 and a pair of connector parts 21 extending in the length direction while connecting the respective spacer parts 20.

In such case, almost uniform gaps can be created between adjoining blade springs along the length direction of the springs by the respective spacer parts 20.

The blade tensioner according to an aspect of the invention offers an effect that because a spacer member is created by means of molding or press-punching a net band, the spacer member can be produced more easily.

Figure 8:
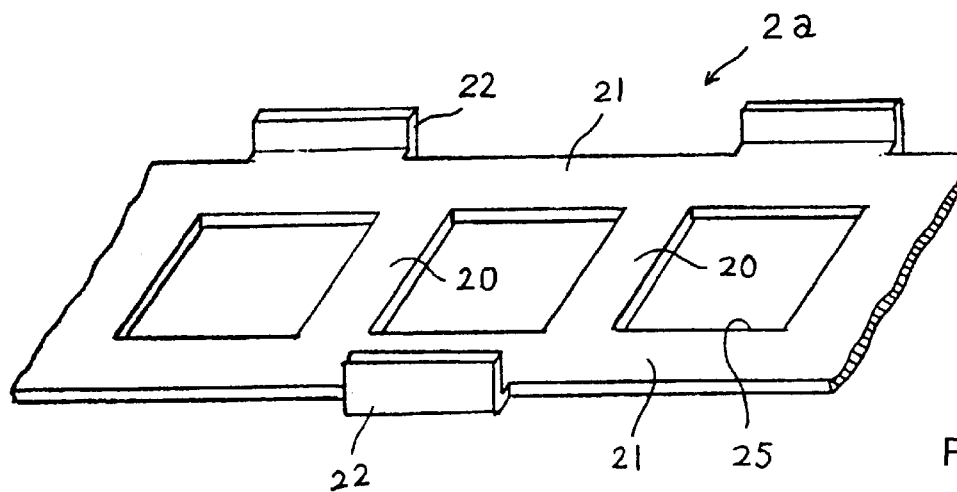
FIG. 8 is a partial oblique view of a spacer member provided with a retaining function, showing a modification example of the spacer member in FIG. 7.

FIG. 8 shows a case in which a retaining function has been added to the spacer member shown in FIG. 7, wherein the same symbols in FIG. 8 as those in FIG. 7 indicate the same parts or the equivalent. In the case of the spacer member 2a, upright wall parts 22 standing upright in the direction intersecting the direction spacer parts 20 are laid out are created on outer edge parts of respective connector parts 21. With attachment onto the blade spring, these upright wall parts 22 are placed on both ends of the blade spring B, whereby the spacer member 2a can be prevented from falling off the blade spring after the blade tensioner is assembled.

Furthermore, in the aforementioned respective aspects, friction materials may be provided through bonding or molding at the contact parts where the respective spacer parts 10 and 20 of the spacer members come in contact with the blade springs. In such case, sliding resistance against the spacer members that is created as the blade springs are deformed can be increased. Accordingly, damping force by the blade springs can be increased, and the damping performance of the blade tensioner can be improved.

What is claimed is:

1. A blade tensioner for applying tension to a chain, the blade tensioner comprising:
   a blade shoe having a chain sliding face;
   a plurality of blade springs disposed on a reverse side of the blade shoe from the chain sliding face effective to provide a damping force in response to chain vibrations, the blade springs each having a longitudinal axis; and
   spacer members disposed between at least two of the blade springs, the spacer members contacting the blade springs at a plurality of discrete points positioned a distance apart along the longitudinal axes of the at least two blade springs effective to inhibit fluctuations in the spring damping force.

2. A blade tensioner according to claim 1, wherein the spacer members are dimensioned to provide substantially similar gaps between the blade springs.

3. A blade tensioner according to claim 1, wherein the spacer members comprise a plurality of spacer parts laid out at predetermined intervals along the spring longitudinal axis and at least one connector part extending parallel to the spring longitudinal axis connecting the respective spacer parts.

4. A blade tensioner according to claim 3, wherein the spacer parts have cross sections in the shape of a circle, an oval, or a rectangle.

5. A blade tensioner according to claim 3, wherein retainer parts are created at the ends of the spacer parts in order to assist in maintaining the spacer parts relative to the blade springs.

6. A blade tensioner according to claim 3, wherein the connector part has a retaining element to assist in maintaining the position of the spacer parts relative to the blade springs.

7. A blade tensioner according to claim 1, wherein the spacer members are created by molding or press-punching a band.

8. A blade tensioner according to claim 1, wherein a friction surface is provided between the spacer members and the blade springs.

9. A set of blade springs for urging a tensioner shoe against a chain, the springs having a compressive range and providing a damping force, the set of blade springs comprising:
   a first blade spring having an upper planar surface and a lower planar surface, the first blade spring having a longitudinal axis;
   a second blade spring having an upper planar surface and a lower planar surface disposed below the first blade spring, the second blade spring having a longitudinal axis, the lower planar surface of the first blade spring and the upper planar surface of the second blade spring in engagement relation at least at two discrete locations, the engagement locations spaced along the longitudinal axis of the first and second blade springs a predetermined distance apart, the spacing generally maintained throughout the compressive range of the springs and selected to inhibit fluctuations in the damping force.

10. A set of blade springs according to claim 9, wherein the lower planar surface of the first blade spring and the upper planar surface of the second blade spring engage each other via at least two spacer members extending transversely with respect to the longitudinal axes of the first and second blade springs.

11. A set of blade springs according to claim 10, wherein the spacer members are connected with at least one connector part.

12. A set of blade springs according to claim 10, wherein the spacer members are connected at their ends with connector parts.

13. A set of blade springs according to claim 12, wherein the connector parts have retainment features for retaining the blade springs with respect thereto.

14. A set of blade springs according to claim 10, wherein the spacer members have retainment features formed at their ends for retaining the blade springs thereon.

15. A method of tensioning a chain with a blade tensioner providing a damping force, the method comprising:
   urging a blade shoe against a chain, the blade shoe having a first face and a second opposing face, the first face having a chain sliding surface;
   applying a spring force to the second face of the blade shoe with a plurality of blade springs, the blade springs providing a damping force in response to chain vibrations effective to damp the vibrations, each of the blade springs having a longitudinal axis;
   spacing at least two adjacent blade springs of the plurality of blade springs apart with spacer members disposed therebetween, the spacer members contacting the blade springs at least at two discrete points separated from each other along the longitudinal axes of the blade springs by a predetermined distance effective to inhibit fluctuations in the damping force of the blade springs.

16. A method of tensioning a chain according to claim 15, including connecting the spacer members with at least one connector part.

17. A method of tensioning a chain according to claim 16, including maintaining the blade springs relative to the connector part with retainment features formed retainment features formed on the connector part.

18. A method of tensioning a chain according to claim 15, including maintaining the blade springs relative to the spacer members with retainment features formed at ends of the spacer members.

19. A method of tensioning a chain according to claim 15, including providing a friction surface between the blade springs effective to increase damping of the tensioner.

20. A blade tensioner for applying tension to a chain, the blade tensioner comprising:

a blade shoe having a chain sliding face;

a plurality of blade springs disposed on a reverse side blade shoe opposite the chain sliding face effective to provide a damping force in response to chain vibrations, the blade springs each having a longitudinal axis; and means for spacing the blade springs apart at two or more discrete points effective to inhibit fluctuations in the damping force of the tensioner, the means for spacing being spaced a distance apart along the longitudinal axes of the blade springs.

* * * * *